(12) United States Patent
Kim (10) Patent No.: US 11,954,898 B1
(45) Date of Patent: Apr. 9, 2024

(54) LEARNING METHOD AND LEARNING DEVICE FOR PERFORMING TRANSFER LEARNING ON AN OBJECT DETECTOR THAT HAS BEEN TRAINED TO DETECT FIRST OBJECT CLASSES SUCH THAT THE OBJECT DETECTOR IS ABLE TO DETECT SECOND OBJECT CLASSES, AND TESTING METHOD AND TESTING DEVICE USING THE SAME

(71) Applicant: Superb AI Co., Ltd., Seoul (KR)

(72) Inventor: Kye Hyeon Kim, Suwon-si (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 18/384,664

(22) Filed: Oct. 27, 2023

(30) Foreign Application Priority Data

Nov. 10, 2022 (KR) .................. 10-2022-0149465

(51) Int. Cl.
| | |
|---|---|
| G06V 10/764 | (2022.01) |
| G06V 10/22 | (2022.01) |
| G06V 10/42 | (2022.01) |
| G06V 10/766 | (2022.01) |
| G06V 10/77 | (2022.01) |
| G06V 10/774 | (2022.01) |
| G06V 10/776 | (2022.01) |
| G06V 10/82 | (2022.01) |

(52) U.S. Cl.
CPC ............ *G06V 10/764* (2022.01); *G06V 10/22* (2022.01); *G06V 10/421* (2022.01); *G06V 10/766* (2022.01); *G06V 10/7715* (2022.01); *G06V 10/774* (2022.01); *G06V 10/776* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 10,303,981 | B1 * | 5/2019 | Kim | G06F 18/213 |
| 10,304,009 | B1 * | 5/2019 | Kim | G06N 3/045 |
| 10,635,915 | B1 * | 4/2020 | Kim | G06V 20/584 |
| 10,816,993 | B1 * | 10/2020 | Tran | G06V 20/56 |
| 10,928,830 | B1 * | 2/2021 | Tran | G06N 3/045 |
| 11,842,495 | B2 * | 12/2023 | Kalra | G05B 13/027 |
| 2020/0250450 | A1 * | 8/2020 | Kim | G06V 10/82 |
| 2020/0394458 | A1 * | 12/2020 | Yu | G06V 10/82 |
| 2021/0403037 | A1 * | 12/2021 | Horigome | G06N 3/045 |
| 2023/0316536 | A1 * | 10/2023 | Lee | G06V 10/774 382/103 |
| 2023/0375292 | A1 * | 11/2023 | Won | G06V 20/60 |

* cited by examiner

*Primary Examiner* — Soo Shin
(74) *Attorney, Agent, or Firm* — Frost Todd Brown LLP; Alexander J. Johnson (57) ABSTRACT

There is provided a learning method and a learning device for performing transfer learning on an object detector that has been trained to detect first object classes such that the object detector is able to detect second object classes. Further, a testing method and a testing device are provided to allow at least part of the first object classes and the second object classes to be detected by using the object detector having been trained through the transfer learning. Accordingly, a detection performance can be improved for the second object classes that cannot be detected through training data set corresponding to the first object classes.

16 Claims, 5 Drawing Sheets

LEARNING METHOD AND LEARNING DEVICE FOR PERFORMING TRANSFER LEARNING ON AN OBJECT DETECTOR THAT HAS BEEN TRAINED TO DETECT FIRST OBJECT CLASSES SUCH THAT THE OBJECT DETECTOR IS ABLE TO DETECT SECOND OBJECT CLASSES, AND TESTING METHOD AND TESTING DEVICE USING THE SAME

CROSS REFERENCE OF RELATED APPLICATION

This present application claims the benefit of the earlier filing date of Korean patent application No. 10-2022-0149465, filed on Nov. 10, 2022, the entire contents of which being incorporated herein by reference.

FIELD OF THE DISCLOSURE

The present disclosure relates to a learning method and a learning device for performing transfer learning to detect novel object classes; and more particularly, to the learning method and the learning device for performing the transfer learning on the object detector that has been trained to detect first object classes such that the object detector is able to detect second object classes, and a testing method and a testing device using the same.

BACKGROUND OF THE DISCLOSURE

On condition that an object detector has been trained to detect first object classes, a conventional transfer learning may be applied to the object detector to allow the object detector to detect novel object classes, e.g., second object classes. The conventional transfer learning is explained by referring to FIG. 1 as below.

Figure 1:
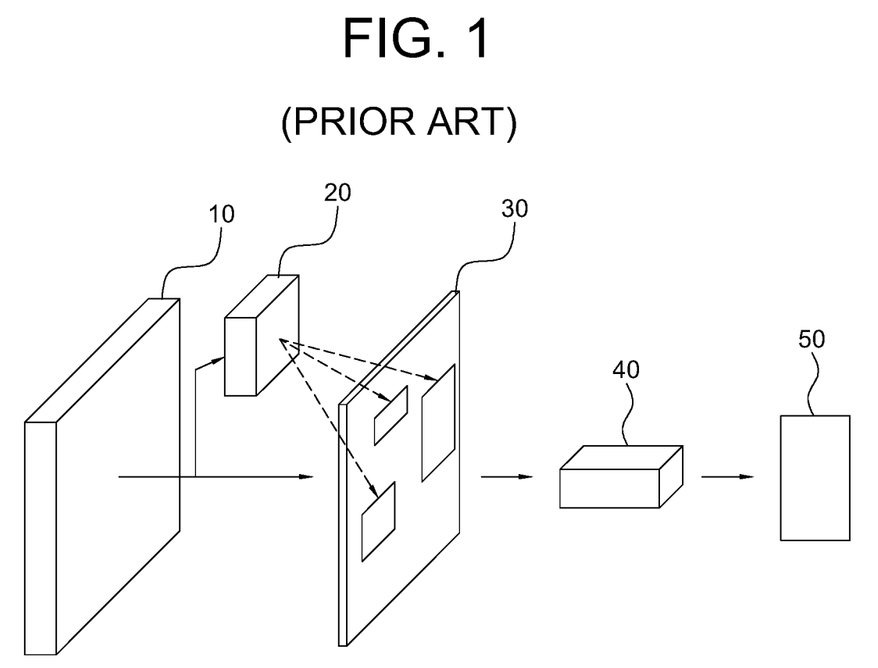
FIG. 1 is a drawing schematically illustrating a conventional object detector.

FIG. 1 is a drawing schematically illustrating an object detector which includes at least one convolutional layer 10, an ROI proposal network 20, at least one pooling layer 30, a first FC (fully-connected) layer 40 and a second FC layer 50.

As processes of training the object detector to detect the first object classes, (i) first training images including one or more first objects corresponding to the first object classes may be acquired, (ii) first feature maps may be outputted by applying at least one convolution operation to each of the first training images through the convolutional layer 10, (iii) first ROI proposals may be outputted, wherein the first ROI proposals may be acquired by predicting object regions in each of the first feature maps corresponding to each of the first training images through the ROI (region of interest) proposal network 20, (iv) first pooled feature maps may be outputted by pooling each of regions corresponding to the first ROI proposals in each of the first feature maps through the pooling layer 30, (v) first FC outputs may be generated by applying first FC operations to the first pooled feature maps through the first FC (fully-connected) layer 40, (vi) pieces of first class prediction information and pieces of first regression prediction information corresponding to objects in the first training images may be outputted by applying second FC operations to the first FC outputs through the second FC layer 50, (vii) first class losses and first regression losses may be acquired by referring to pieces of first class GT (ground truth) information and pieces of first regression GT information corresponding to each of pieces of the first class prediction information and pieces of the first regression prediction information, (viii) the first class losses and the first regression losses may be backpropagated and thus first parameters of the convolutional layer, second parameters of the ROI proposal network, third parameters of the first FC layer and fourth parameters of the second FC layer may be trained.

In addition, a learning device may perform transfer learning on the object detector such that the object detector having been trained to detect the first object classes can detect the second object classes. For example, on condition that values of the first parameters of the convolutional layer 10 of the object detector and the second parameters of the ROI proposal network 20 having been trained for the first object classes, the learning device may perform the transfer learning on the object detector by using second training images including second objects corresponding to the second object classes through fine-tuning of the third parameters of the first FC layer 40 and the fourth parameters of the second FC layer 50 of the object detector.

However, the object detector trained according to the conventional transfer learning has problems as below.

That is, in case the first object classes are related to common objects (for example, objects such as humans, vehicles, animals, roads, etc.) but the second object classes are related to uncommon objects (for example, objects such as accessories attached to a human body, objects such as vehicle logo), the object detector having been trained by the transfer learning on condition that the values of the second parameters of the ROI proposal network are fixed may be difficult to output accurate ROI proposals for the uncommon objects, i.e., objects corresponding to the second object classes. Accordingly, the first FC layer and the second FC layer may perform their corresponding FC operations by using inaccurate ROI proposals for the uncommon objects corresponding to the second object classes, and thus there are problems that both the first FC layer and the second FC layer cannot be trained well.

Therefore, an enhanced method for solving the aforementioned problems is required.

SUMMARY OF THE DISCLOSURE

It is an object of the present disclosure to solve all the aforementioned problems.

It is another object of the present disclosure to perform transfer learning on an object detector that has been trained to detect first object classes to allow the object detector to detect second object classes.

It is still another object of the present disclosure to improve a detection performance for the second object classes that cannot be trained through training data set corresponding to the first object classes.

In accordance with one aspect of the present disclosure, there is provided a learning method for performing transfer learning on an object detector that has been trained to detect first object classes such that the object detector is able to detect second object classes, comprising steps of: (a) on condition that (i) first training images including one or more first objects corresponding to the first object classes have been acquired from a first training data set, (ii) first feature maps have been outputted by applying at least one convolution operation to each of the first training images through at least one convolutional layer, (iii) first ROI proposals have been outputted, wherein the first ROI proposals have been acquired by predicting object regions in each of the first feature maps corresponding to each of the first training images through a first ROI (region of interest) proposal network, (iv) first pooled feature maps have been outputted, wherein the first pooled feature maps have been acquired by pooling each of regions corresponding to the first ROI proposals in each of the first feature maps through a pooling layer, (v) first FC outputs have been generated by applying first FC operation to the first pooled feature maps through a first FC (fully-connected) layer, (vi) pieces of first class prediction information and pieces of first regression prediction information corresponding to objects of the first training images have been outputted by applying second FC operation to the first FC outputs through a second FC layer, (vii) first class losses and first regression losses have been acquired by referring to pieces of first class GT (ground truth) information and pieces of first regression GT information corresponding to each of pieces of the first class prediction information and pieces of the first regression prediction information, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects corresponding to the second object classes from a second training data set, a learning device instructing the convolutional layer having the first parameters trained in advance to output second feature maps by applying the convolution operation to each of the second training images; (b) the learning device (i) instructing each of the first ROI proposal network having the second parameters trained in advance and a second ROI proposal network having fifth parameters that have not been trained to perform a process of predicting object regions in each of the second training images by referring to each of the second feature maps, thereby outputting each of (2_1)-st ROI proposals and (2_2)-nd ROI proposals, and (ii) instructing the pooling layer to pool regions corresponding to each of the (2_1)-st ROI proposals and the (2_2)-nd proposals in each of the second feature maps, thereby outputting second pooled feature maps; (c) the learning device (i) instructing the first FC layer having third parameters trained in advance to generate second FC outputs by applying the first FC operation to the second pooled feature maps, and (ii) instructing the second FC layer having fourth parameters that have not been trained to apply the second FC operation to the second FC outputs, thereby outputting pieces of second class prediction information and pieces of second regression prediction information corresponding to objects on the second training images; and (d) the learning device (i) acquiring second class losses and second regression losses by referring to pieces of the second class prediction information, pieces of the second regression prediction information and pieces of second class GT information and pieces of second regression GT information, respectively corresponding to pieces of the second class prediction information and pieces of the second regression prediction information, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained.

As one example, at the step of (c), the learning device instructs the second FC layer to apply the second FC operation to the second FC outputs, thereby outputting, as the pieces of the second class prediction information and the pieces of the second regression prediction information, (i) pieces of (2_1)-st class prediction information and pieces of (2_1)-st regression prediction information corresponding to the first objects and (ii) pieces of (2_2)-nd class prediction information and pieces of (2_2)-nd regression prediction information corresponding to the second objects, wherein the first objects and the second objects are selected among objects on the second training images, and, wherein, at the step of (d), the learning device (i) acquires (2_1)-st class losses and (2_1)-st regression losses by referring to the pieces of the (2_1)-st class prediction information, the pieces of the (2_1)-st regression prediction information and their corresponding pieces of (2_1)-st class GT information and their corresponding pieces of (2_1)-st regression GT information, and acquires (2_2)-nd class losses and (2_2)-nd regression losses by referring to the pieces of the (2_2)-nd class prediction information, the pieces of the (2_2)-nd regression prediction information and their corresponding pieces of (2_2)-nd class GT information and pieces of (2_2)-nd regression GT information corresponding thereto, and (ii) (ii-1) backpropagating the (2_1)-st class losses and the (2_1)-st regression losses, thereby further training the third parameters of the first FC layer that have been trained in advance and the fourth parameters of the second FC layer that have not been trained; and (ii-2) backpropagating the (2_2)-nd class losses and the (2_2)-nd regression losses, thereby further training the fifth parameters of the second ROI proposal network that have not been trained, the third parameters of the first FC layer that have been trained in advance and the fourth parameters of the second FC layer that have not been trained.

As one example, at the step of (d), the learning device further trains the fifth parameters of the second ROI proposal network that have not been trained, the third parameters of the first FC layer that have been trained in advance and the fourth parameters of the second FC layer that have not been trained, and maintains the first parameters of the convolutional layer that have been trained in advance and the second parameters of the first ROI proposal network that have been trained in advance.

As one example, at the step of (b), the learning device instructs each of the first ROI proposal network and the second ROI proposal network to (i) predict each of first object region candidates and second objects region candidates in each of the second training images by referring to each of the second feature maps, thereby outputting each of (2_1)-st ROI proposal candidates and (2_2)-nd ROI proposal candidates, and (ii) (ii-1) determine each of the (2_1)-st ROI proposals and the (2_ 2)-nd ROI proposals, with probabilities of containing each of the first objects and the second objects therein higher than a threshold probability, among each of the (2_1)-st ROI proposal candidates and the (2_2)-nd ROI proposal candidates, and (ii-2) pool regions corresponding to each of the (2_1)-st ROI proposals and each of the (2_2)-nd ROI proposals in each of the second feature maps, thereby outputting the second pooled feature maps.

As one example, the first training data set includes at least part of COCO (Common Object in Context) data set, PASCAL VOC data set and ILSVRC (ImageNet Large Scale Visual Recognition Challenge) data set.

As one example, each of the second training images included in the second training data set contains at least one of the second objects corresponding to the second object classes, and at least part of the second training images further contains at least one of the first objects corresponding to the first object classes.

In accordance with another aspect of the present disclosure, there is provided a testing method for detecting at least part of first object classes and second object classes by using an object detector that has been trained by transfer learning, comprising steps of: (a) after a learning device has performed processes of: (I) on condition that (i) first training images including one or more first objects for training corresponding to the first object classes for training have been acquired from a first training data set, (ii) first feature maps for training have been outputted by applying at least one convolution operation to each of the first training images through at least one convolutional layer, (iii) first ROI proposals for training have been outputted, wherein the first ROI proposals for training have been acquired by predicting object regions for training in each of the first feature maps for training corresponding to each of the first training images through a first ROI (region of interest) proposal network, (iv) first pooled feature maps for training have been outputted, wherein the first pooled feature maps for training have been acquired by pooling each of regions for training corresponding to the first ROI proposals for training in each of the first feature maps for training through a pooling layer, (v) first FC outputs for training have been generated by applying first FC operation to the first pooled feature maps for training through a first FC (fully-connected) layer, (vi) pieces of first class prediction information for training and pieces of first regression prediction information for training corresponding to objects for training of the first training images have been outputted by applying second FC operation to the first FC outputs for training through a second FC layer, (vii) first class losses and first regression losses have been acquired by referring to pieces of first class GT (ground truth) information and pieces of first regression GT information corresponding to their corresponding pieces of the first class prediction information for training and pieces of the first regression prediction information for training, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects for training corresponding to the second object classes for training from a second training data set, instructing the convolutional layer having the first parameters trained in advance to output second feature maps for training by applying the convolution operation to each of the second training images; (II) (i) instructing each of the first ROI proposal network having the second parameters trained in advance and a second ROI proposal network having fifth parameters that have not been trained to perform a process of predicting object regions for training in each of the second training images by referring to each of the second feature maps for training, thereby outputting each of (2_1)-st ROI proposals for training and (2_2)-nd ROI proposals for training, and (ii) instructing the pooling layer to pool regions for training corresponding to each of the (2_1)-st ROI proposals for training and the (2_2)-nd proposals for training in each of the second feature maps for training, thereby outputting second pooled feature maps for training; (III) (i) instructing the first FC layer having third parameters trained in advance to generate second FC outputs by applying the first FC operation to the second pooled feature maps for training, and (ii) instructing the second FC layer having fourth parameters that have not been trained to apply the second FC operation on the second FC outputs for training, thereby outputting pieces of second class prediction information for training and pieces of second regression prediction information for training corresponding to objects for training on the second training images; and (IV) (i) acquiring second class losses and second regression losses by referring to pieces of the second class prediction information for training, pieces of the second regression prediction information for training and pieces of second class GT information and pieces of second regression GT information, respectively corresponding to pieces of the second class prediction information for training and pieces of the second regression prediction information for training, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained, in response to acquiring a test image containing at least part of first objects for testing and second objects for testing corresponding to first object classes for testing and second object classes for testing, a testing device instructing the convolutional layer to apply the convolution operation to the test image, thereby outputting a feature map for testing; (b) the testing device (i) instructing each of the first ROI proposal network and the second ROI proposal network to perform a process of predicting at least one of object regions for testing in the test image by referring to the feature map for testing, thereby outputting each of (2_1)-st ROI proposals for testing and (2_2)-nd ROI proposals for testing and (ii) instructing the pooling layer to pool regions for testing corresponding to each of the (2_1)-st ROI proposals for testing and the (2_2)-nd proposals for testing in each of the feature map for testing, thereby outputting a second pooled feature map for testing; (c) the testing device (i) instructing the first FC layer to generate a second FC output for testing by applying the first FC operation on the second pooled feature map for testing, and (ii) instructing the second FC layer to output second class prediction information for testing and second regression prediction information for testing corresponding to objects for testing on the test image by applying the second FC operation to the second FC output for testing.

As one example, at the step of (c), the testing device instructs the second FC layer to apply the second FC operation to the second FC output for testing, thereby outputting the second class prediction information for testing and second regression prediction information for testing by using (i) (2_1)-st class prediction information for testing and (2_1)-st regression prediction information for testing corresponding to at least part of the first objects for testing and (ii) (2_2)-nd class prediction information for testing and (2_2)-nd regression prediction information for testing corresponding to at least part of the second objects for testing.

In accordance with still another aspect of the present disclosure, there is provided a learning device for performing transfer learning on an object detector that has been trained to detect first object classes such that the object detector is able to detect second object classes, comprising: at least one memory that stores instructions; and at least one processor configured to execute the instructions to perform or support another device to perform processes of: (I) on condition that (i) first training images including one or more first objects corresponding to the first object classes have been acquired from a first training data set, (ii) first feature maps have been outputted by applying at least one convolution operation to each of the first training images through at least one convolutional layer, (iii) first ROI proposals have been outputted, wherein the first ROI proposals have been acquired by predicting object regions in each of the first feature maps corresponding to each of the first training images through a first ROI (region of interest) proposal network, (iv) first pooled feature maps have been outputted, wherein the first pooled feature maps have been acquired by pooling each of regions corresponding to the first ROI proposals in each of the first feature maps through a pooling layer, (v) first FC outputs have been generated by applying first FC operation to the first pooled feature maps through a first FC (fully-connected) layer, (vi) pieces of first class prediction information and pieces of first regression prediction information corresponding to objects of the first training images have been outputted by applying second FC operation to the first FC outputs through a second FC layer, (vii) first class losses and first regression losses have been acquired by referring to pieces of first class GT (ground truth) information and pieces of first regression GT information corresponding to each of pieces of the first class prediction information and pieces of the first regression prediction information, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects corresponding to the second object classes from a second training data set, instructing the convolutional layer having the first parameters trained in advance to output second feature maps by applying the convolution operation to each of the second training images; (II) (i) instructing each of the first ROI proposal network having the second parameters trained in advance and a second ROI proposal network having fifth parameters that have not been trained to perform a process of predicting object regions in each of the second training images by referring to each of the second feature maps, thereby outputting each of (2_1)-st ROI proposals and (2_2)-nd ROI proposals, and (ii) instructing the pooling layer to pool regions corresponding to each of the (2_1)-st ROI proposals and the (2_2)-nd proposals in each of the second feature maps, thereby outputting second pooled feature maps; (III) (i) instructing the first FC layer having third parameters trained in advance to generate second FC outputs by applying the first FC operation to the second pooled feature maps, and (ii) instructing the second FC layer having fourth parameters that have not been trained to apply the second FC operation to the second FC outputs, thereby outputting pieces of second class prediction information and pieces of second regression prediction information corresponding to objects on the second training images; and (IV) (i) acquiring second class losses and second regression losses by referring to pieces of the second class prediction information, pieces of the second regression prediction information and pieces of second class GT information and pieces of second regression GT information, respectively corresponding to pieces of the second class prediction information and pieces of the second regression prediction information, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained.

As one example, at the process of (III), the processor instructs the second FC layer to apply the second FC operation to the second FC outputs, thereby outputting, as the pieces of the second class prediction information and the pieces of the second regression prediction information, (i) pieces of (2_1)-st class prediction information and pieces of (2_1)-st regression prediction information corresponding to the first objects and (ii) pieces of (2_2)-nd class prediction information and pieces of (2_2)-nd regression prediction information corresponding to the second objects, wherein the first objects and the second objects are selected among objects on the second training images, and, wherein, at the process of (IV), the processor (i) acquires (2_1)-st class losses and (2_1)-st regression losses by referring to the pieces of the (2_1)-st class prediction information, the pieces of the (2_1)-st regression prediction information and their corresponding pieces of (2_1)-st class GT information and their corresponding pieces of (2_1)-st regression GT information, and acquires (2_2)-nd class losses and (2_2)-nd regression losses by referring to the pieces of the (2_2)-nd class prediction information, the pieces of the (2_2)-nd regression prediction information and their corresponding pieces of (2_2)-nd class GT information and pieces of (2_2)-nd regression GT information corresponding thereto, and (ii) (ii-1) backpropagating the (2_1)-st class losses and the (2_1)-st regression losses, thereby further training the third parameters of the first FC layer that have been trained in advance and the fourth parameters of the second FC layer that have not been trained; and (ii-2) backpropagating the (2_2)-nd class losses and the (2_2)-nd regression losses, thereby further training the fifth parameters of the second ROI proposal network that have not been trained, the third parameters of the first FC layer that have been trained in advance and the fourth parameters of the second FC layer that have not been trained.

As one example, at the process of (IV), the processor further trains the fifth parameters of the second ROI proposal network that have not been trained, the third parameters of the first FC layer that have been trained in advance and the fourth parameters of the second FC layer that have not been trained, and maintains the first parameters of the convolutional layer that have been trained in advance and the second parameters of the first ROI proposal network that have been trained in advance.

As one example, at the process of (II), the processor instructs each of the first ROI proposal network and the second ROI proposal network to (i) predict each of first object region candidates and second objects region candidates in each of the second training images by referring to each of the second feature maps, thereby outputting each of (2_1)-st ROI proposal candidates and (2_2)-nd ROI proposal candidates, and (ii) (ii-1) determine each of the (2_1)-st ROI proposals and the (2_ 2)-nd ROI proposals, with probabilities of containing each of the first objects and the second objects therein higher than a threshold probability, among each of the (2_1)-st ROI proposal candidates and the (2_2)-nd ROI proposal candidates, and (ii-2) pool regions corresponding to each of the (2_1)-st ROI proposals and each of the (2_2)-nd ROI proposals in each of the second feature maps, thereby outputting the second pooled feature maps.

As one example, there is provided the learning device characterized in that the first training data set includes at least part of COCO (Common Object in Context) data set, PASCAL VOC data set and ILSVRC (ImageNet Large Scale Visual Recognition Challenge) data set.

As one example, there is provided the learning device characterized in that each of the second training images included in the second training data set contains at least one of the second objects corresponding to the second object classes, and at least part of the second training images further contains at least one of the first objects corresponding to the first object classes.

In accordance with still another aspect of the present disclosure, there is provided a testing device for detecting at least part of first object classes and second object classes by using an object detector that has been trained by transfer learning, comprising: at least one memory that stores instructions; and at least one processor configured to execute the instructions to perform or support another device to perform: (1) after a learning device has performed processes of: (I) on condition that (i) first training images including one or more first objects for training corresponding to the first object classes for training have been acquired from a first training data set, (ii) first feature maps for training have been outputted by applying at least one convolution operation to each of the first training images through at least one convolutional layer, (iii) first ROI proposals for training have been outputted, wherein the first ROI proposals for training have been acquired by predicting object regions for training in each of the first feature maps for training corresponding to each of the first training images through a first ROI (region of interest) proposal network, (iv) first pooled feature maps for training have been outputted, wherein the first pooled feature maps for training have been acquired by pooling each of regions for training corresponding to the first ROI proposals for training in each of the first feature maps for training through a pooling layer, (v) first FC outputs for training have been generated by applying first FC operation to the first pooled feature maps for training through a first FC (fully-connected) layer, (vi) pieces of first class prediction information for training and pieces of first regression prediction information for training corresponding to objects for training of the first training images have been outputted by applying second FC operation to the first FC outputs for training through a second FC layer, (vii) first class losses and first regression losses have been acquired by referring to pieces of first class GT (ground truth) information and pieces of first regression GT information corresponding to their corresponding pieces of the first class prediction information for training and pieces of the first regression prediction information for training, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects for training corresponding to the second object classes for training from a second training data set, instructing the convolutional layer having the first parameters trained in advance to output second feature maps for training by applying the convolution operation to each of the second training images; (II) (i) instructing each of the first ROI proposal network having the second parameters trained in advance and a second ROI proposal network having fifth parameters that have not been trained to perform a process of predicting object regions for training in each of the second training images by referring to each of the second feature maps for training, thereby outputting each of (2_1)-st ROI proposals for training and (2_2)-nd ROI proposals for training, and (ii) instructing the pooling layer to pool regions for training corresponding to each of the (2_1)-st ROI proposals for training and the (2_2)-nd proposals for training in each of the second feature maps for training, thereby outputting second pooled feature maps for training; (III) (i) instructing the first FC layer having third parameters trained in advance to generate second FC outputs by applying the first FC operation to the second pooled feature maps for training, and (ii) instructing the second FC layer having fourth parameters that have not been trained to apply the second FC operation on the second FC outputs for training, thereby outputting pieces of second class prediction information for training and pieces of second regression prediction information for training corresponding to objects for training on the second training images; and (IV) (i) acquiring second class losses and second regression losses by referring to pieces of the second class prediction information for training, pieces of the second regression prediction information for training and pieces of second class GT information and pieces of second regression GT information, respectively corresponding to pieces of the second class prediction information for training and pieces of the second regression prediction information for training, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained, in response to acquiring a test image containing at least part of first objects for testing and second objects for testing corresponding to first object classes for testing and second object classes for testing, a process of instructing the convolutional layer to apply the convolution operation to the test image, thereby outputting a feature map for testing; (2) processes of (i) instructing each of the first ROI proposal network and the second ROI proposal network to perform a process of predicting at least one of object regions for testing in the test image by referring to the feature map for testing, thereby outputting each of (2_1)-st ROI proposals for testing and (2_2)-nd ROI proposals for testing and (ii) instructing the pooling layer to pool regions for testing corresponding to each of the (2_1)-st ROI proposals for testing and the (2_2)-nd proposals for testing in each of the feature map for testing, thereby outputting a second pooled feature map for testing; and (3) processes of (i) instructing the first FC layer to generate a second FC output for testing by applying the first FC operation on the second pooled feature map for testing, and (ii) instructing the second FC layer to output second class prediction information for testing and second regression prediction information for testing corresponding to objects for testing on the test image by applying the second FC operation to the second FC output for testing.

As one example, at the process of (III), the processor instructs the second FC layer to apply the second FC operation to the second FC output for testing, thereby outputting the second class prediction information for testing and second regression prediction information for testing by using (i) (2_1)-st class prediction information for testing and (2_1)-st regression prediction information for testing corresponding to at least part of the first objects for testing and (ii) (2_2)-nd class prediction information for testing and (2_2)-nd regression prediction information for testing corresponding to at least part of the second objects for testing.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

Figure 2:
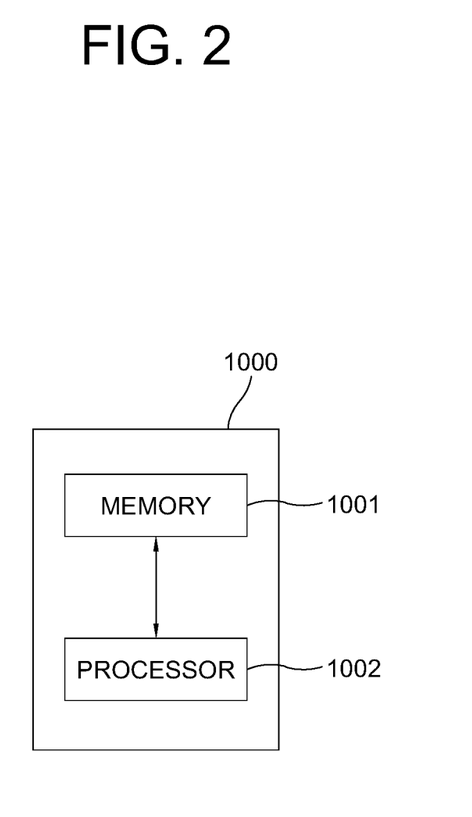
FIG. 2 is a drawing schematically illustrating a learning device for performing transfer learning on an object detector that has been trained to detect first object classes such that the object detector is able to detect second object classes in accordance with one example embodiment of the present disclosure.

FIG. 2 is a drawing schematically illustrating a learning device 1000 for performing transfer learning on an object detector that has been trained to detect first object classes such that the object detector is able to detect second object classes in accordance with one example embodiment of the present disclosure.

Referring to FIG. 2, the learning device 1000 may include a memory 1001 that stores instructions for performing the transfer learning on the object detector that has been trained to detect the first object classes such that the object detector is able to detect the second object classes and a processor 1002 configured to perform the transfer learning on the object detector that has been trained to detect the first object classes such that the object detector is able to detect the second object classes. Herein, the learning device 1000 may include a PC and a mobile computer, etc.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Processes of performing the transfer learning on the object detector that has been trained to detect the first object classes such that the object detector is able to detect the second object classes by using the learning device 1000 configured as explained above is described by referring to FIG. 3.

Figure 3:
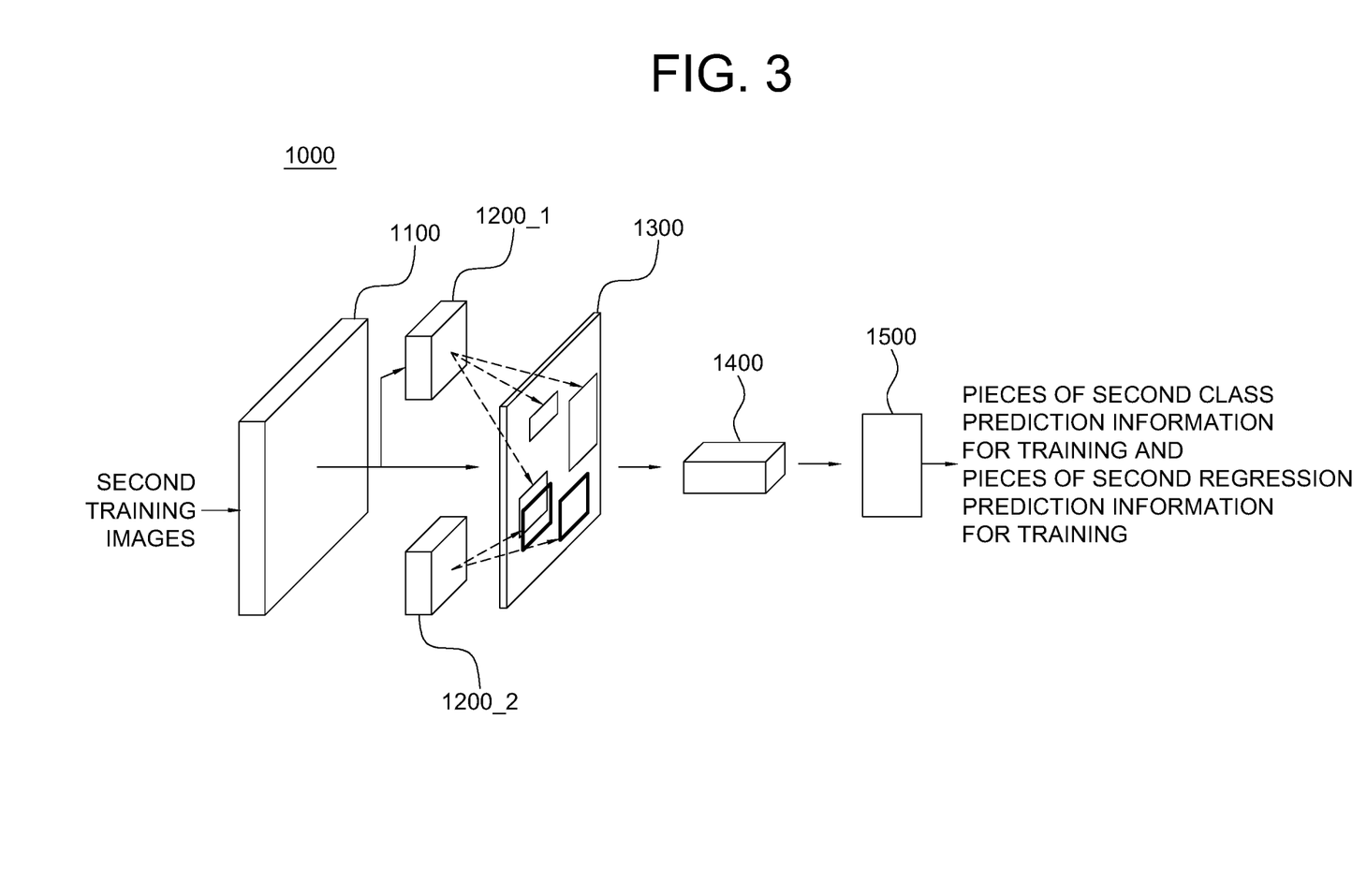
FIG. 3 is a drawing for explaining a method for performing the transfer learning on the object detector that has been trained to detect the first object classes such that the object detector is able to detect the second object classes in accordance with one example embodiment of the present disclosure.

Firstly, it may be performed in advance as follows: (i) first training images including one or more first objects corresponding to the first object classes are acquired from a first training data set, (ii) first feature maps are outputted by applying at least one convolution operation to each of the first training images through at least one convolutional layer, (iii) first ROI proposals are outputted, wherein the first ROI proposals are acquired by predicting object regions in each of the first feature maps corresponding to each of the first training images through a first ROI (region of interest) proposal network, (iv) first pooled feature maps are outputted, wherein the first pooled feature maps are acquired by pooling each of regions corresponding to the first ROI proposals in each of the first feature maps through a pooling layer, (v) first FC outputs are generated by applying first FC operation to the first pooled feature maps through a first FC (fully-connected) layer, (vi) pieces of first class prediction information and pieces of first regression prediction information corresponding to objects of the first training images are outputted by applying second FC operation to the first FC outputs through a second FC layer, (vii) first class losses and first regression losses are acquired by referring to pieces of first class GT (ground truth) information and pieces of first regression GT information corresponding to each of pieces of the first class prediction information and pieces of the first regression prediction information, (viii) the first class losses and the first regression losses are backpropagated and thus first parameters of the convolutional layer, second parameters of the first ROI proposal network, third parameters of the first FC layer and fourth parameters of the second FC layer are trained.

Herein, the first training data set may include at least part of COCO (Common Object in Context) data set, PASCAL VOC data set and ILSVRC (ImageNet Large Scale Visual Recognition Challenge) data set. However, this is merely an example to help understanding, and the first training data set of the present invention is not limited thereto.

For reference, common object classes of the first training data set may be classes related to common objects (that is, the first objects) commonly included in the existing training data set such as humans, vehicles, animals, roads, etc. Meanwhile, uncommon object classes of the second training data set to be explained later may be classes related to uncommon objects (for example, accessories attached to a human body, a logo attached in front of a vehicle, etc.) rarely included in the existing training data set.

On condition that the object detector has been trained to detect the first object classes through the processes above, the second training images including at least one of second objects corresponding to the second object classes may be acquired from a second training data set as shown in FIG. 3.

For reference, each of the second training images included in the second training data set may contain at least one of the second objects corresponding to the second object classes, and at least part of the second training images may further contain at least one of the first objects corresponding to the first object classes.

For example, some part of the second training images (e.g., 100,000 training images) included in the second training data set may contain at least one of the second objects (for example, accessories worn by pedestrians, a vehicle logo, etc.), and the other part of the second training images (e.g., 30,000 training images) may further contain at least one of the first objects (for example, pedestrians, animals, vehicles, etc.).

In addition, the learning device 1000 may instruct the convolutional layer 1100 having the first parameters trained in advance to output second feature maps by applying the convolution operation to each of the second training images. For reference, the first parameters trained in advance, the second parameters trained in advance and the third parameters trained in advance to be explained later may be identical respectively to the parameters of the convolutional layer, the parameters of the first ROI proposal network and the parameters of the first FC layer of the object detector having been trained to detect the first object classes through the first training data set. Through this, even if the amount of the second training data set is little, the object detector having been trained by the transfer learning may maintain a prominent detection performance regarding the first object classes.

In addition, the learning device 1000 may instruct each of the first ROI proposal network 1200_1 having the second parameters (trained in advance) and a second ROI proposal network 1200_2 having fifth parameters (that have not been trained) to perform a process of predicting object regions in each of the second training images by referring to each of the second feature maps, thereby outputting each of (2_1)-st ROI proposals and (2_2)-nd ROI proposals. For reference, random values may be assigned as initial values for the fifth parameters not having been trained and the fourth parameters not having been trained.

For reference, for the fourth parameters of the second FC layer, the fourth parameters of the second FC layer trained by using the first training data set cannot be applied as they are, because the number of classes that can be classified by the second FC layer of the object detector trained by using the first training data set is $C_S+1$, whereas the number of classes that can be classified by the second FC layer of the object detector trained by using the second training data set is $C_T+1$, and thus the weight size is different from each other.

In addition, the learning device 1000 may instruct the pooling layer 1300 to pool regions corresponding to each of the (2_1)-st ROI proposals and the (2_2)-nd proposals in each of the second feature maps, thereby outputting second pooled feature maps.

As one example, the learning device 1000 may instruct each of the first ROI proposal network 1200_1 and the second ROI proposal network 1200_2 to (i) predict each of first object region candidates and second object region candidates in each of the second training images by referring to each of the second feature maps, thereby outputting each of (2_1)-st ROI proposal candidates and (2_2)-nd ROI proposal candidates, and (ii) (ii-1) determine each of the (2_1)-st ROI proposals and the (2_2)-nd ROI proposals, with probabilities of containing each of the first objects and the second objects therein higher than a threshold probability, among each of the (2_1)-st ROI proposal candidates and the (2_2)-nd ROI proposal candidates, and (ii-2) instruct the pooling layer 1300 to pool regions corresponding to each of the (2_1)-st ROI proposals and each of the (2_2)-nd ROI proposals in each of the second feature maps, thereby outputting the second pooled feature maps.

In addition, the learning device 1000 may (i) instruct the first FC layer 1400 having the third parameters trained in advance to apply the first FC operation to the second pooled feature maps, thereby generating second FC outputs, and (ii) instruct the second FC layer 1500 having the fourth parameters that have not been trained to apply the second FC operation to the second FC outputs, thereby outputting pieces of second class prediction information (that is, pieces of second class prediction information for training of FIG. 3) and pieces of second regression prediction information (that is, pieces of second regression prediction information for training of FIG. 3) corresponding to objects on the second training images.

As one example, the learning device 1000 may instruct the second FC layer 1500 to apply the second FC operation to the second FC outputs, thereby outputting (i) pieces of (2_1)-st class prediction information and pieces of (2_1)-st regression prediction information corresponding to the first objects and (ii) pieces of (2_2)-nd class prediction information and pieces of (2_2)-nd regression prediction information corresponding to the second objects, as the pieces of the second class prediction information and the pieces of the second regression prediction information. Herein, the first objects and the second objects are contained in the second training images.

In addition, the learning device 1000 may (i) acquire second class losses and second regression losses by referring to (1) pieces of the second class prediction information and pieces of the second regression prediction information and (2) pieces of second class GT information and pieces of second regression GT information, respectively corresponding to the pieces of the second class prediction information and the pieces of the second regression prediction information, and (ii) backpropagate the second class losses and the second regression losses, thereby further training the fifth parameters of the second ROI proposal network 1200_2 that have not been trained, the third parameters of the first FC layer 1400 that have been trained in advance and the fourth parameters of the second FC layer 1500 that have not been trained.

As one example, the learning device 1000 may (i) acquire (2_1)-st class losses and (2_1)-st regression losses by referring to the pieces of the (2_1)-st class prediction information, the pieces of the (2_1)-st regression prediction information and their corresponding pieces of (2_1)-st class GT information and their corresponding pieces of (2_1)-st regression GT information, and acquires (2_2)-nd class losses and (2_2)-nd regression losses by referring to the pieces of the (2_2)-nd class prediction information, the pieces of the (2_2)-nd regression prediction information and their corresponding pieces of (2_2)-nd class GT information and pieces of (2_2)-nd regression GT information, and (ii) (ii-1) backpropagate the (2_1)-st class losses and the (2_1)-st regression losses, thereby further training the third parameters of the first FC layer 1400 that have been trained in advance and the fourth parameters of the second FC layer 1500 that have not been trained and (ii-2) backpropagate the (2_2)-nd class losses and the (2_2)-nd regression losses, thereby further training the fifth parameters of the second ROI proposal network 1200_2 that have not been trained, the third parameters of the first FC layer 1400 that have been trained in advance and the fourth parameters of the second FC layer 1500 that have not been trained.

Herein, the learning device 1000 may further train the fifth parameters of the second ROI proposal network 1200_2 that have not been trained, the third parameters of the first FC layer 1400 that have been trained in advance and the fourth parameters of the second FC layer 1500 that have not been trained, while maintaining the first parameters of the convolutional layer 1100 that have been trained in advance and the second parameters of the first ROI proposal network 1200_1 that have been trained in advance (i.e., without further training of the first parameters of the convolutional layer 1100 and the second parameters of the first ROI proposal network 1200_1). Through this, the learning device 1000 may perform the transfer learning to allow the object detector having been trained to detect the first object classes to accurately detect the second object classes based only on little amount of the second training data.

As explained, on condition that the object detector capable of detecting the first object classes has been trained by the transfer learning such that the object detector is able to detect the second object classes, operations of a testing device will be explained by referring to FIG. 4 and FIG. 5.

Figure 4:
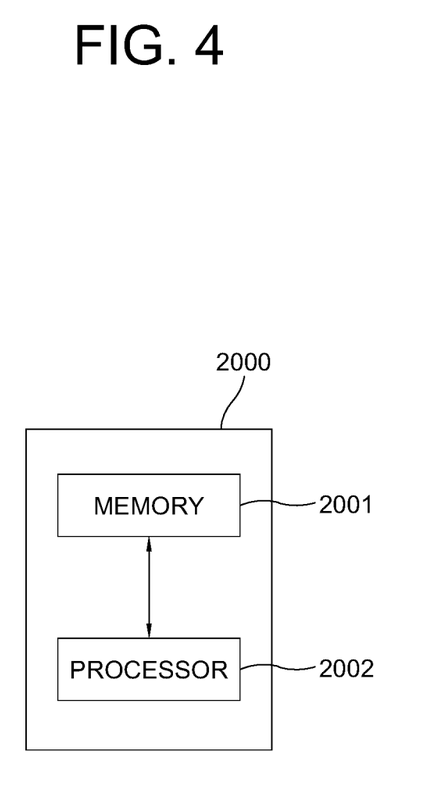
FIG. 4 is a drawing schematically illustrating a testing device using the method for performing the transfer learning on the object detector that has been trained to detect the first object classes such that the object detector is able to detect the second object classes in accordance with one example embodiment of the present disclosure.
Figure 5:
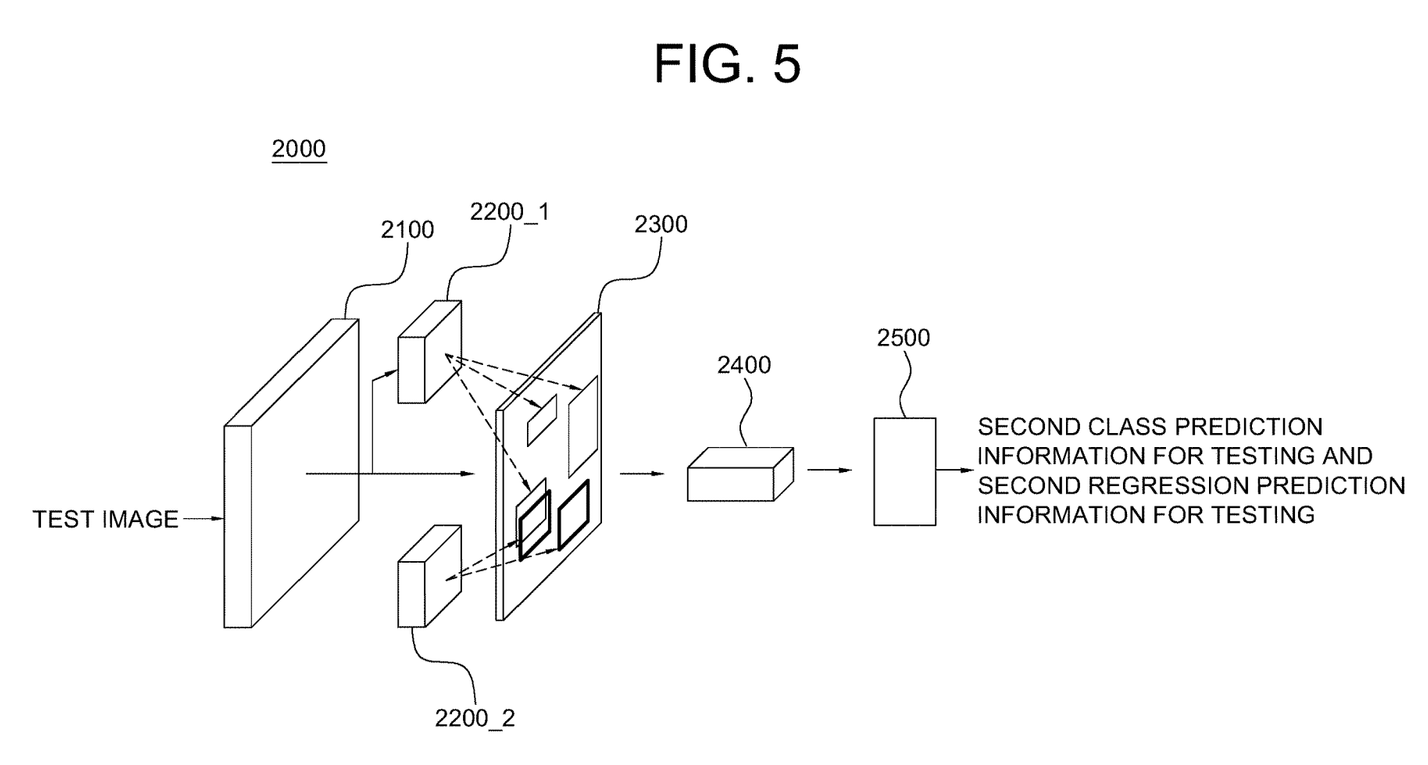
FIG. 5 is a drawing for explaining a testing method using the method for performing the transfer learning on the object detector that has been trained to detect the first object classes such that the object detector is able to detect the second object classes in accordance with one example embodiment of the present disclosure.

Firstly, referring to FIG. 4, a testing device 2000 for detecting at least part of the first object classes and the second object classes by using the object detector that has been trained by the transfer learning.

The testing device 2000 may include a memory 2001 that stores instructions for detecting at least part of the first object classes and the second object classes by using the object detector that has been trained by the transfer learning and a processor 2002 configured to perform operations for detecting at least part of the first object classes and the second object classes by using the object detector that has been trained by the transfer learning.

Specifically, the testing device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Herein, the testing device 2000 may be an identical device to the learning device 1000 shown in FIG. 2, or a different device from the learning device 1000.

Processes of detecting at least part of the first object classes and the second object classes by using the object detector trained by the transfer learning will be explained more specifically by referring to FIG. 5 below.

Firstly, as already explained through FIG. 2 and FIG. 3, on condition that the object detector has been trained by the transfer learning by using the first training data set and the second training data set, in response to acquiring at least one test image containing at least part of first objects for testing and second objects for testing respectively corresponding to the first object classes for testing and the second object classes for testing, the testing device 2000 may instruct at least one convolutional layer 2100 to apply at least one convolution operation to the test image, thereby outputting a feature map for testing.

In addition, the testing device 2000 may (i) instruct each of the first ROI proposal network 2200_1 and the second ROI proposal network 2200_2 to perform a process of predicting at least one of object regions for testing in the test image by referring to the feature map for testing, thereby outputting each of (2_1)-st ROI proposals for testing and (2_2)-nd ROI proposals for testing and (ii) instruct the pooling layer 2300 to pool regions for testing corresponding to each of the (2_1)-st ROI proposals for testing and the (2_2)-nd proposals for testing in each of the feature map for testing, thereby outputting a second pooled feature map for testing.

In addition, the testing device 2000 may (i) instruct the first FC layer 2400 to generate a second FC output for testing by applying the first FC operation to the second pooled feature map for testing, and (ii) instruct the second FC layer 2500 to output second class prediction information for testing and second regression prediction information for testing corresponding to objects for testing on the test image by applying the second FC operation to the second FC output for testing.

Herein, the testing device 2000 may (i) instruct the second FC layer 2500 to apply the second FC operation to the second FC output for testing, thereby outputting the second class prediction information for testing and second regression prediction information for testing by using (2_1)-st class prediction information for testing and (2_1)-st regression prediction information for testing corresponding to at least part of the first objects for testing and (2_2)-nd class prediction information for testing and (2_2)-nd regression prediction information for testing corresponding to at least part of the second objects for testing.

The present disclosure has an effect of the present disclosure to perform the transfer learning on the object detector that has been trained to detect the first object classes to allow the object detector to detect the second object classes.

The present disclosure has another effect of the present disclosure to improve a detection performance for the second object classes that cannot be trained through training data set corresponding to the first object classes.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for performing transfer learning on an object detector that has been trained to detect first object classes such that the object detector is able to detect second object classes, comprising steps of:
   (a) on condition that (i) first training images including one or more first objects corresponding to the first object classes have been acquired from a first training data set, (ii) first feature maps have been outputted by applying at least one convolution operation to each of the first training images through at least one convolutional layer, (iii) first ROI proposals have been outputted, wherein the first ROI proposals have been acquired by predicting object regions in each of the first feature maps corresponding to each of the first training images through a first ROI (region of interest) proposal network, (iv) first pooled feature maps have been outputted, wherein the first pooled feature maps have been acquired by pooling each of regions corresponding to the first ROI proposals in each of the first feature maps through a pooling layer, (v) first FC outputs have been generated by applying first FC operation to the first pooled feature maps through a first FC (fully-connected) layer, (vi) pieces of first class prediction information and pieces of first regression prediction information corresponding to objects of the first training images have been outputted by applying second FC operation to the first FC outputs through a second FC layer, (vii) first class losses and first regression losses have been acquired by referring to pieces of first class GT (ground truth) information and pieces of first regression GT information corresponding to each of pieces of the first class prediction information and pieces of the first regression prediction information, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects corresponding to the second object classes from a second training data set, a learning device instructing the convolutional layer having the first parameters trained in advance to output second feature maps by applying the convolution operation to each of the second training images;
   (b) the learning device (i) instructing each of the first ROI proposal network having the second parameters trained in advance and a second ROI proposal network having fifth parameters that have not been trained to perform a process of predicting object regions in each of the second training images by referring to each of the second feature maps, thereby outputting each of (2_1)-st ROI proposals and (2_2)-nd ROI proposals, and (ii) instructing the pooling layer to pool regions corresponding to each of the (2_1)-st ROI proposals and the (2_2)-nd proposals in each of the second feature maps, thereby outputting second pooled feature maps;
   (c) the learning device (i) instructing the first FC layer having the third parameters trained in advance to generate second FC outputs by applying the first FC operation to the second pooled feature maps, and (ii) instructing the second FC layer having the fourth parameters that have not been trained to apply the second FC operation to the second FC outputs, thereby outputting pieces of second class prediction information and pieces of second regression prediction information corresponding to objects on the second training images; and
   (d) the learning device (i) acquiring second class losses and second regression losses by referring to pieces of the second class prediction information, pieces of the second regression prediction information and pieces of second class GT information and pieces of second regression GT information, respectively corresponding to pieces of the second class prediction information and pieces of the second regression prediction information, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained.

2. The learning method of claim 1, wherein, at the step of (c), the learning device instructs the second FC layer to apply the second FC operation to the second FC outputs, thereby outputting, as the pieces of the second class prediction information and the pieces of the second regression prediction information, (i) pieces of (2_1)-st class prediction information and pieces of (2_1)-st regression prediction information corresponding to the first objects and (ii) pieces of (2_2)-nd class prediction information and pieces of (2_2)-nd regression prediction information corresponding to the second objects, wherein the first objects and the second objects are selected among objects on the second training images, and,     wherein, at the step of (d), the learning device (i) acquires (2_1)-st class losses and (2_1)-st regression losses by referring to the pieces of the (2_1)-st class prediction information, the pieces of the (2_1)-st regression prediction information and their corresponding pieces of (2_1)-st class GT information and their corresponding pieces of (2_1)-st regression GT information, and acquires (2_2)-nd class losses and (2_2)-nd regression losses by referring to the pieces of the (2_2)-nd class prediction information, the pieces of the (2_2)-nd regression prediction information and their corresponding pieces of (2_2)-nd class GT information and pieces of (2_2)-nd regression GT information corresponding thereto, and (ii) (ii-1) backpropagating the (2_1)-st class losses and the (2_1)-st regression losses, thereby further training the third parameters of the first FC layer that have been trained in advance and the fourth parameters of the second FC layer that have not been trained; and (ii-2) backpropagating the (2_2)-nd class losses and the (2_2)-nd regression losses, thereby further training the fifth parameters of the second ROI proposal network that have not been trained, the third parameters of the first FC layer that have been trained in advance and the fourth parameters of the second FC layer that have not been trained.

3. The learning method of claim 1, wherein, at the step of (d), the learning device further trains the fifth parameters of the second ROI proposal network that have not been trained, the third parameters of the first FC layer that have been trained in advance and the fourth parameters of the second FC layer that have not been trained, and maintains the first parameters of the convolutional layer that have been trained in advance and the second parameters of the first ROI proposal network that have been trained in advance.

4. The learning method of claim 1, wherein, at the step of (b), the learning device instructs each of the first ROI proposal network and the second ROI proposal network to (i) predict each of first object region candidates and second objects region candidates in each of the second training images by referring to each of the second feature maps, thereby outputting each of (2_1)-st ROI proposal candidates and (2_2)-nd ROI proposal candidates, and (ii) (ii-1) determine each of the (2_1)-st ROI proposals and the (2_2)-nd ROI proposals, with probabilities of containing each of the first objects and the second objects therein higher than a threshold probability, among each of the (2_1)-st ROI proposal candidates and the (2_2)-nd ROI proposal candidates, and (ii-2) pool regions corresponding to each of the (2_1)-st ROI proposals and each of the (2_2)-nd ROI proposals in each of the second feature maps, thereby outputting the second pooled feature maps.

5. The learning method of claim 1, wherein the first training data set includes at least part of COCO (Common Object in Context) data set, PASCAL VOC data set and ILSVRC (ImageNet Large Scale Visual Recognition Challenge) data set.

6. The learning method of claim 1, wherein each of the second training images included in the second training data set contains at least one of the second objects corresponding to the second object classes, and at least part of the second training images further contains at least one of the first objects corresponding to the first object classes.

7. A testing method for detecting at least part of first object classes and second object classes by using an object detector that has been trained by transfer learning, comprising steps of:

(a) after a learning device has performed processes of: (I) on condition that (i) first training images including one or more first objects for training corresponding to the first object classes for training have been acquired from a first training data set, (ii) first feature maps for training have been outputted by applying at least one convolution operation to each of the first training images through at least one convolutional layer, (iii) first ROI proposals for training have been outputted, wherein the first ROI proposals for training have been acquired by predicting object regions for training in each of the first feature maps for training corresponding to each of the first training images through a first ROI (region of interest) proposal network, (iv) first pooled feature maps for training have been outputted, wherein the first pooled feature maps for training have been acquired by pooling each of regions for training corresponding to the first ROI proposals for training in each of the first feature maps for training through a pooling layer, (v) first FC outputs for training have been generated by applying first FC operation to the first pooled feature maps for training through a first FC (fully-connected) layer, (vi) pieces of first class prediction information for training and pieces of first regression prediction information for training corresponding to objects for training of the first training images have been outputted by applying second FC operation to the first FC outputs for training through a second FC layer, (vii) first class losses and first regression losses have been acquired by referring to pieces of first class GT (ground truth) information and pieces of first regression GT information corresponding to their corresponding pieces of the first class prediction information for training and pieces of the first regression prediction information for training, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects for training corresponding to the second object classes for training from a second training data set, instructing the convolutional layer having the first parameters trained in advance to output second feature maps for training by applying the convolution operation to each of the second training images; (II) (i) instructing each of the first ROI proposal network having the second parameters trained in advance and a second ROI proposal network having fifth parameters that have not been trained to perform a process of predicting object regions for training in each of the second training images by referring to each of the second feature maps for training, thereby outputting each of (2_1)-st ROI proposals for training and (2_2)-nd ROI proposals for training, and (ii) instructing the pooling layer to pool regions for training corresponding to each of the (2_1)-st ROI proposals for training and the (2_2)-nd proposals for training in each of the second feature maps for training, thereby outputting second pooled feature maps for training; (III) (i) instructing the first FC layer having the third parameters trained in advance to generate second FC outputs by applying the first FC operation to the second pooled feature maps for training, and (ii) instructing the second FC layer having the fourth parameters that have not been trained to apply the second FC operation on the second FC outputs for training, thereby outputting pieces of second class prediction information for training and pieces of second regression prediction information for training corresponding to objects for training on the second training images; and (IV) (i) acquiring second class losses and second regression losses by referring to pieces of the second class prediction information for training, pieces of the second regression prediction information for training and pieces of second class GT information and pieces of second regression GT information, respectively corresponding to pieces of the second class prediction information for training and pieces of the second regression prediction information for training, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained, in response to acquiring a test image containing at least part of first objects for testing and second objects for testing corresponding to first object classes for testing and second object classes for testing, a testing device instructing the convolutional layer to apply the convolution operation to the test image, thereby outputting a feature map for testing;

(b) the testing device (i) instructing each of the first ROI proposal network and the second ROI proposal network to perform a process of predicting at least one of object regions for testing in the test image by referring to the feature map for testing, thereby outputting each of (2_1)-st ROI proposals for testing and (2_2)-nd ROI proposals for testing and (ii) instructing the pooling layer to pool regions for testing corresponding to each of the (2_1)-st ROI proposals for testing and the (2_2)-nd proposals for testing in each of the feature map for testing, thereby outputting a second pooled feature map for testing;

(c) the testing device (i) instructing the first FC layer to generate a second FC output for testing by applying the first FC operation on the second pooled feature map for testing, and (ii) instructing the second FC layer to output second class prediction information for testing and second regression prediction information for testing corresponding to objects for testing on the test image by applying the second FC operation to the second FC output for testing.

8. The method of claim 7, wherein, at the step of (c), the testing device instructs the second FC layer to apply the second FC operation to the second FC output for testing, thereby outputting the second class prediction information for testing and second regression prediction information for testing by using (i) (2_1)-st class prediction information for testing and (2_1)-st regression prediction information for testing corresponding to at least part of the first objects for testing and (ii) (2_2)-nd class prediction information for testing and (2_2)-nd regression prediction information for testing corresponding to at least part of the second objects for testing.

9. A learning device for performing transfer learning on an object detector that has been trained to detect first object classes such that the object detector is able to detect second object classes, comprising:

at least one memory that stores instructions; and at least one processor configured to execute the instructions to perform or support another device to perform processes of: (I) on condition that (i) first training images including one or more first objects corresponding to the first object classes have been acquired from a first training data set, (ii) first feature maps have been outputted by applying at least one convolution operation to each of the first training images through at least one convolutional layer, (iii) first ROI proposals have been outputted, wherein the first ROI proposals have been acquired by predicting object regions in each of the first feature maps corresponding to each of the first training images through a first ROI (region of interest) proposal network, (iv) first pooled feature maps have been outputted, wherein the first pooled feature maps have been acquired by pooling each of regions corresponding to the first ROI proposals in each of the first feature maps through a pooling layer, (v) first FC outputs have been generated by applying first FC operation to the first pooled feature maps through a first FC (fully-connected) layer, (vi) pieces of first class prediction information and pieces of first regression prediction information corresponding to objects of the first training images have been outputted by applying second FC operation to the first FC outputs through a second FC layer, (vii) first class losses and first regression losses have been acquired by referring to pieces of first class GT (ground truth) information and pieces of first regression GT information corresponding to each of pieces of the first class prediction information and pieces of the first regression prediction information, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects corresponding to the second object classes from a second training data set, instructing the convolutional layer having the first parameters trained in advance to output second feature maps by applying the convolution operation to each of the second training images; (II) (i) instructing each of the first ROI proposal network having the second parameters trained in advance and a second ROI proposal network having fifth parameters that have not been trained to perform a process of predicting object regions in each of the second training images by referring to each of the second feature maps, thereby outputting each of (2_1)-st ROI proposals and (2_2)-nd ROI proposals, and (ii) instructing the pooling layer to pool regions corresponding to each of the (2_1)-st ROI proposals and the (2_2)-nd proposals in each of the second feature maps, thereby outputting second pooled feature maps; (III) (i) instructing the first FC layer having the third parameters trained in advance to generate second FC outputs by applying the first FC operation to the second pooled feature maps, and (ii) instructing the second FC layer having the fourth parameters that have not been trained to apply the second FC operation to the second FC outputs, thereby outputting pieces of second class prediction information and pieces of second regression prediction information corresponding to objects on the second training images; and (IV) (i) acquiring second class losses and second regression losses by referring to pieces of the second class prediction information, pieces of the second regression prediction information and pieces of second class GT information and pieces of second regression GT information, respectively corresponding to pieces of the second class prediction information and pieces of the second regression prediction information, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained.

10. The learning device of claim 9, wherein, at the process of (III), the processor instructs the second FC layer to apply the second FC operation to the second FC outputs, thereby outputting, as the pieces of the second class prediction information and the pieces of the second regression prediction information, (i) pieces of (2_1)-st class prediction information and pieces of (2_1)-st regression prediction information corresponding to the first objects and (ii) pieces of (2_2)-nd class prediction information and pieces of (2_2)-nd regression prediction information corresponding to the second objects, wherein the first objects and the second objects are selected among objects on the second training images, and, wherein, at the process of (IV), the processor (i) acquires (2_1)-st class losses and (2_1)-st regression losses by referring to the pieces of the (2_1)-st class prediction information, the pieces of the (2_1)-st regression prediction information and their corresponding pieces of (2_1)-st class GT information and their corresponding pieces of (2_1)-st regression GT information, and acquires (2_2)-nd class losses and (2_2)-nd regression losses by referring to the pieces of the (2_2)-nd class prediction information, the pieces of the (2_2)-nd regression prediction information and their corresponding pieces of (2_2)-nd class GT information and pieces of (2_2)-nd regression GT information corresponding thereto, and (ii) (ii-1) backpropagating the (2_1)-st class losses and the (2_1)-st regression losses, thereby further training the third parameters of the first FC layer that have been trained in advance and the fourth parameters of the second FC layer that have not been trained; and (ii-2) backpropagating the (2_2)-nd class losses and the (2_2)-nd regression losses, thereby further training the fifth parameters of the second ROI proposal network that have not been trained, the third parameters of the first FC layer that have been trained in advance and the fourth parameters of the second FC layer that have not been trained.

11. The learning device of claim 9, wherein, at the process of (IV), the processor further trains the fifth parameters of the second ROI proposal network that have not been trained, the third parameters of the first FC layer that have been trained in advance and the fourth parameters of the second FC layer that have not been trained, and maintains the first parameters of the convolutional layer that have been trained in advance and the second parameters of the first ROI proposal network that have been trained in advance.

12. The learning device of claim 9, wherein, at the process of (II), the processor instructs each of the first ROI proposal network and the second ROI proposal network to (i) predict each of first object region candidates and second objects region candidates in each of the second training images by referring to each of the second feature maps, thereby outputting each of (2_1)-st ROI proposal candidates and (2_2)-nd ROI proposal candidates, and (ii) (ii-1) determine each of the (2_1)-st ROI proposals and the (2_2)-nd ROI proposals, with probabilities of containing each of the first objects and the second objects therein higher than a threshold probability, among each of the (2_1)-st ROI proposal candidates and the (2_2)-nd ROI proposal candidates, and (ii-2) pool regions corresponding to each of the (2_1)-st ROI proposals and each of the (2_2)-nd ROI proposals in each of the second feature maps, thereby outputting the second pooled feature maps.

13. The learning device of claim 9, wherein the first training data set includes at least part of COCO (Common Object in Context) data set, PASCAL VOC data set and ILSVRC (ImageNet Large Scale Visual Recognition Challenge) data set.

14. The learning device of claim 9, wherein each of the second training images included in the second training data set contains at least one of the second objects corresponding to the second object classes, and at least part of the second training images further contains at least one of the first objects corresponding to the first object classes.

15. A testing device for detecting at least part of first object classes and second object classes by using an object detector that has been trained by transfer learning, comprising:
at least one memory that stores instructions; and
at least one processor configured to execute the instructions to perform or support another device to perform: (1) after a learning device has performed processes of: (I) on condition that (i) first training images including one or more first objects for training corresponding to the first object classes for training have been acquired from a first training data set, (ii) first feature maps for training have been outputted by applying at least one convolution operation to each of the first training images through at least one convolutional layer, (iii) first ROI proposals for training have been outputted, wherein the first ROI proposals for training have been acquired by predicting object regions for training in each of the first feature maps for training corresponding to each of the first training images through a first ROI (region of interest) proposal network, (iv) first pooled feature maps for training have been outputted, wherein the first pooled feature maps for training have been acquired by pooling each of regions for training corresponding to the first ROI proposals for training in each of the first feature maps for training through a pooling layer, (v) first FC outputs for training have been generated by applying first FC operation to the first pooled feature maps for training through a first FC (fully-connected) layer, (vi) pieces of first class prediction information for training and pieces of first regression prediction information for training corresponding to objects for training of the first training images have been outputted by applying second FC operation to the first FC outputs for training through a second FC layer, (vii) first class losses and first regression losses have been acquired by referring to pieces of first class GT (ground truth) information and pieces of first regression GT information corresponding to their corresponding pieces of the first class prediction information for training and pieces of the first regression prediction information for training, (viii) the first class losses and the first regression losses have been backpropagated and thus first parameters of the convolutional layer, second parameters of the first ROI proposal network, third parameters of the first FC layer and fourth parameters of the second FC layer have been trained, in response to acquiring second training images including at least one of second objects for training corresponding to the second object classes for training from a second training data set, instructing the convolutional layer having the first parameters trained in advance to output second feature maps for training by applying the convolution operation to each of the second training images; (II) (i) instructing each of the first ROI proposal network having the second parameters trained in advance and a second ROI proposal network having fifth parameters that have not been trained to perform a process of predicting object regions for training in each of the second training images by referring to each of the second feature maps for training, thereby outputting each of (2_1)-st ROI proposals for training and (2_2)-nd ROI proposals for training, and (ii) instructing the pooling layer to pool regions for training corresponding to each of the (2_1)-st ROI proposals for training and the (2_2)-nd proposals for training in each of the second feature maps for training, thereby outputting second pooled feature maps for training; (III) (i) instructing the first FC layer having the third parameters trained in advance to generate second FC outputs by applying the first FC operation to the second pooled feature maps for training, and (ii) instructing the second FC layer having the fourth parameters that have not been trained to apply the second FC operation on the second FC outputs for training, thereby outputting pieces of second class prediction information for training and pieces of second regression prediction information for training corresponding to objects for training on the second training images; and (IV) (i) acquiring second class losses and second regression losses by referring to pieces of the second class prediction information for training, pieces of the second regression prediction information for training and pieces of second class GT information and pieces of second regression GT information, respectively corresponding to pieces of the second class prediction information for training and pieces of the second regression prediction information for training, and (ii) backpropagating the second class losses and the second regression losses, thereby further training the fifth parameters of the second ROI proposal network that have not been trained, the third parameters of the first FC layer that have been trained in advance and the fourth parameters of the second FC layer that have not been trained, in response to acquiring a test image containing at least part of first objects for testing and second objects for testing corresponding to first object classes for testing and second object classes for testing, a process of instructing the convolutional layer to apply the convolution operation to the test image, thereby outputting a feature map for testing; (2) processes of (i) instructing each of the first ROI proposal network and the second ROI proposal network to perform a process of predicting at least one of object regions for testing in the test image by referring to the feature map for testing, thereby outputting each of (2_1)-st ROI proposals for testing and (2_2)-nd ROI proposals for testing and (ii) instructing the pooling layer to pool regions for testing corresponding to each of the (2_1)-st ROI proposals for testing and the (2_2)-nd proposals for testing in each of the feature map for testing, thereby outputting a second pooled feature map for testing; and (3) processes of (i) instructing the first FC layer to generate a second FC output for testing by applying the first FC operation on the second pooled feature map for testing, and (ii) instructing the second FC layer to output second class prediction information for testing and second regression prediction information for testing corresponding to objects for testing on the test image by applying the second FC operation to the second FC output for testing.

16. A testing device of claim 15, wherein, at the process of (III), the processor instructs the second FC layer to apply the second FC operation to the second FC output for testing, thereby outputting the second class prediction information for testing and second regression prediction information for testing by using (i) (2_1)-st class prediction information for testing and (2_1)-st regression prediction information for testing corresponding to at least part of the first objects for testing and (ii) (2_2)-nd class prediction information for testing and (2_2)-nd regression prediction information for testing corresponding to at least part of the second objects for testing.

* * * * *